March 9, 1965
C. G. THIENE
3,172,297
GRIPPER ADAPTED FOR LINEAL INDEXING
Filed Aug. 15, 1962
3 Sheets-Sheet 1
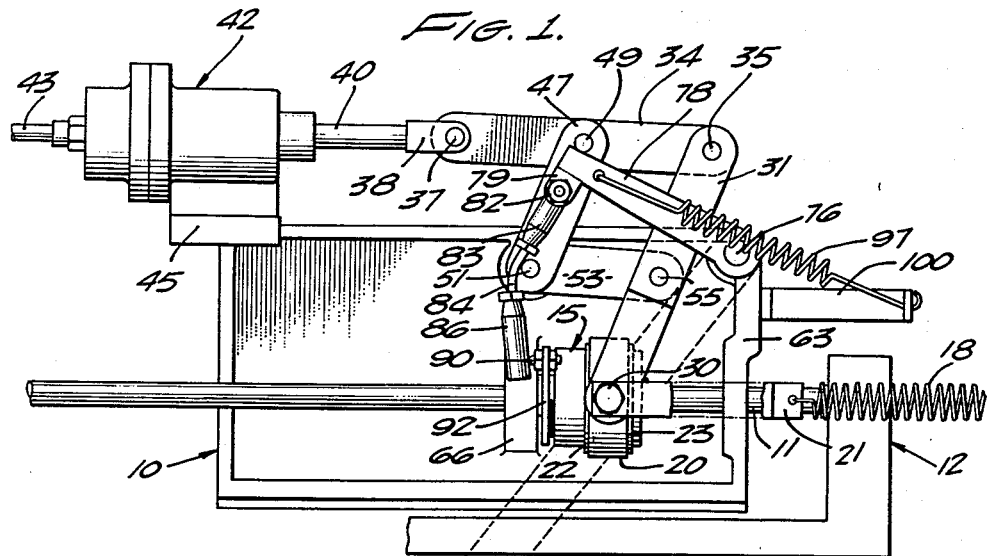
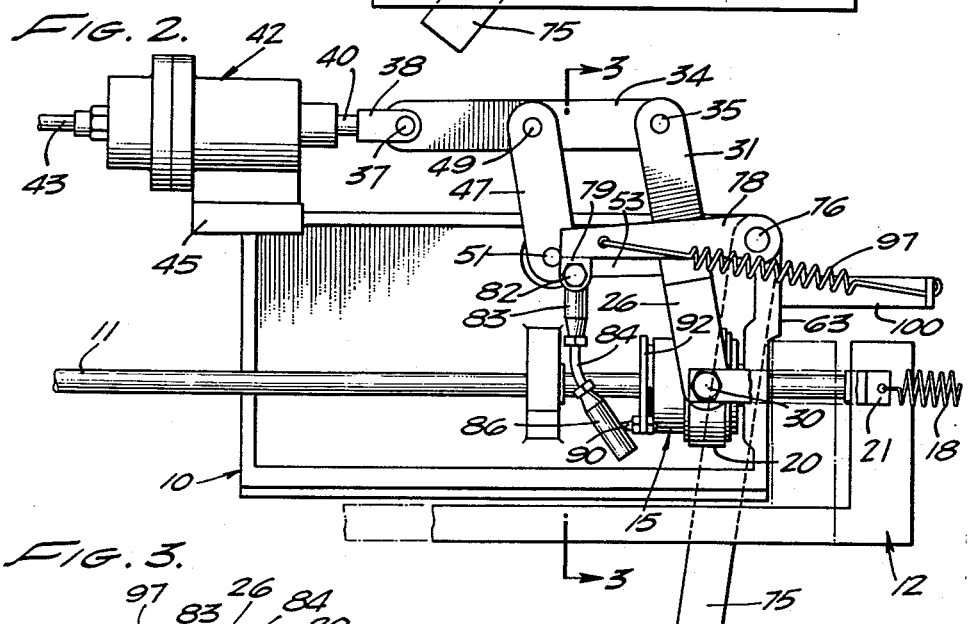
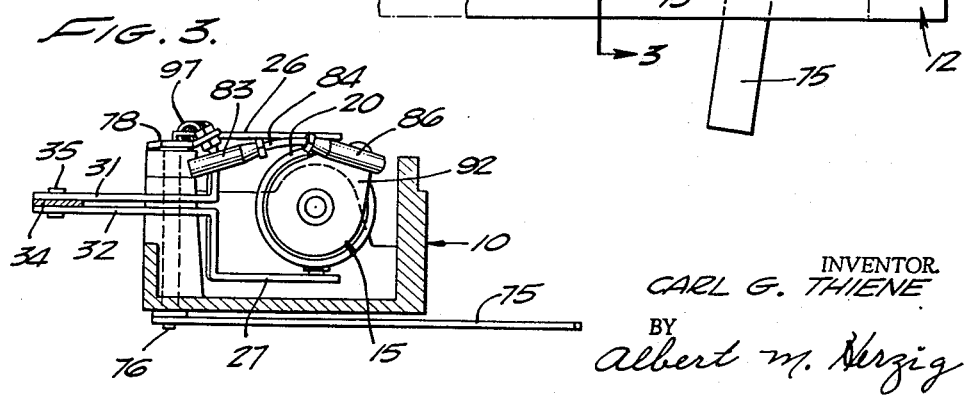
INVENTOR.
CARL G. THIENE
BY
Albert M. Herzig
ATTORNEY

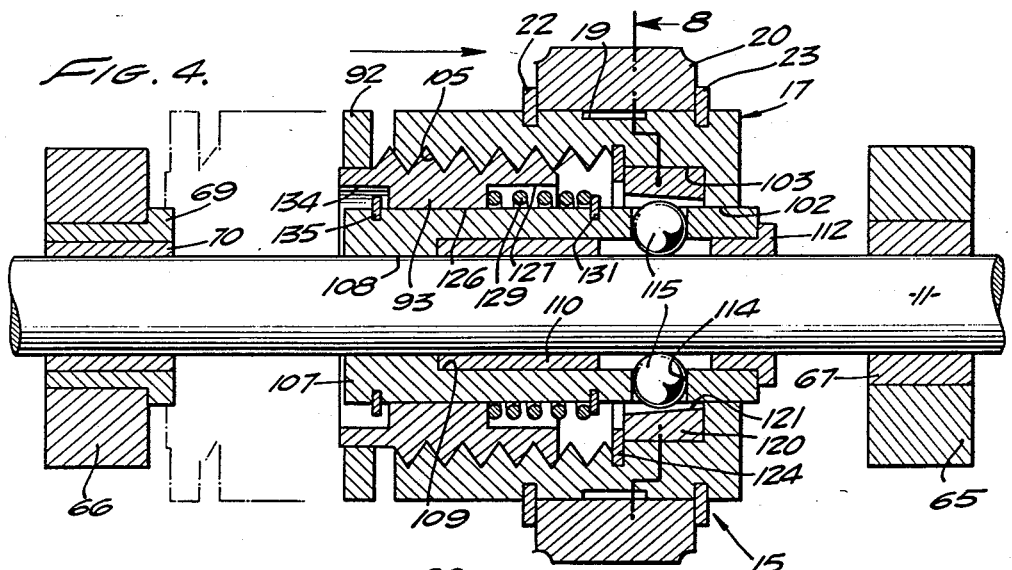
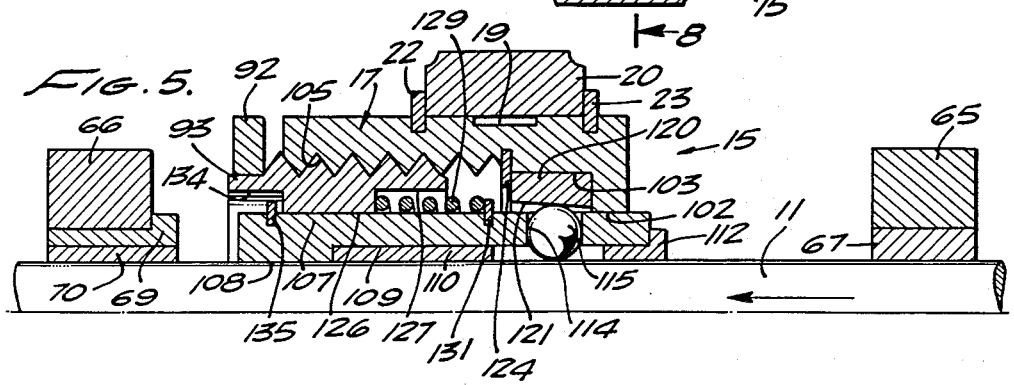
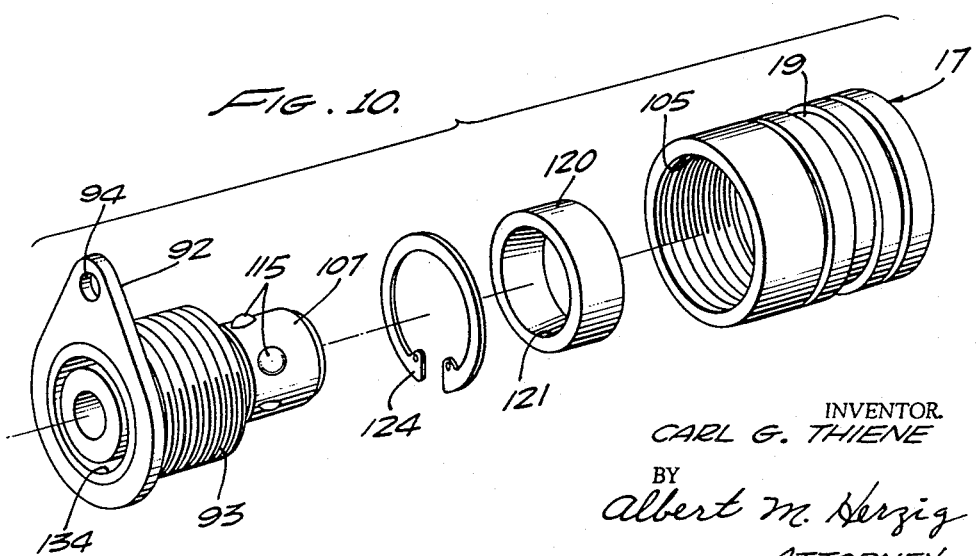

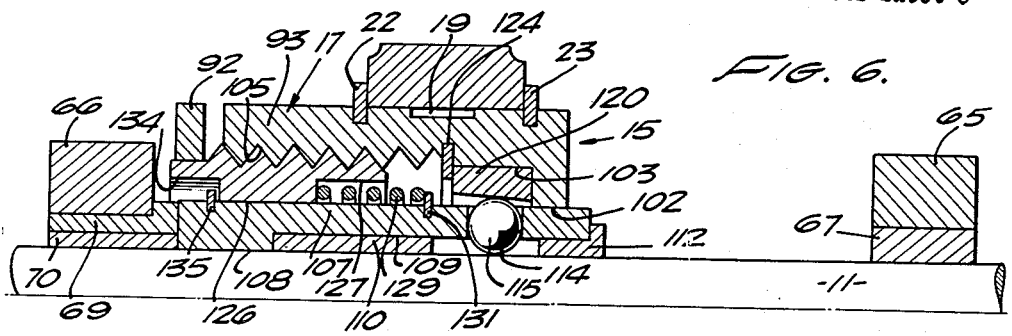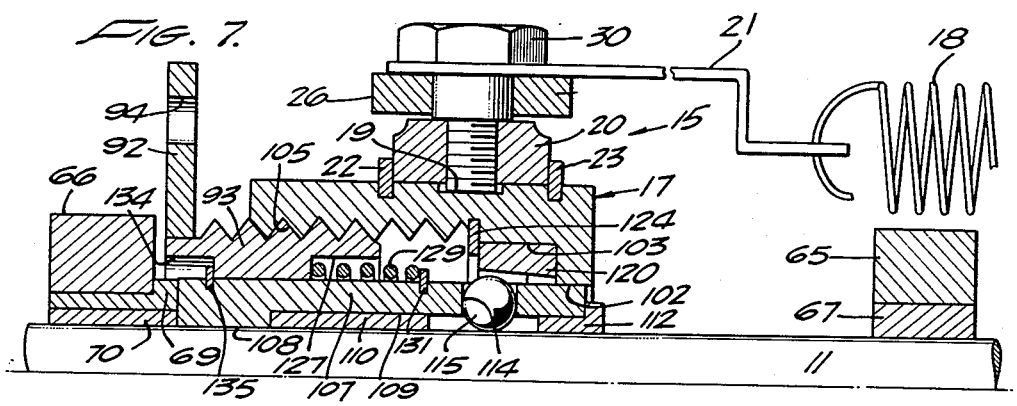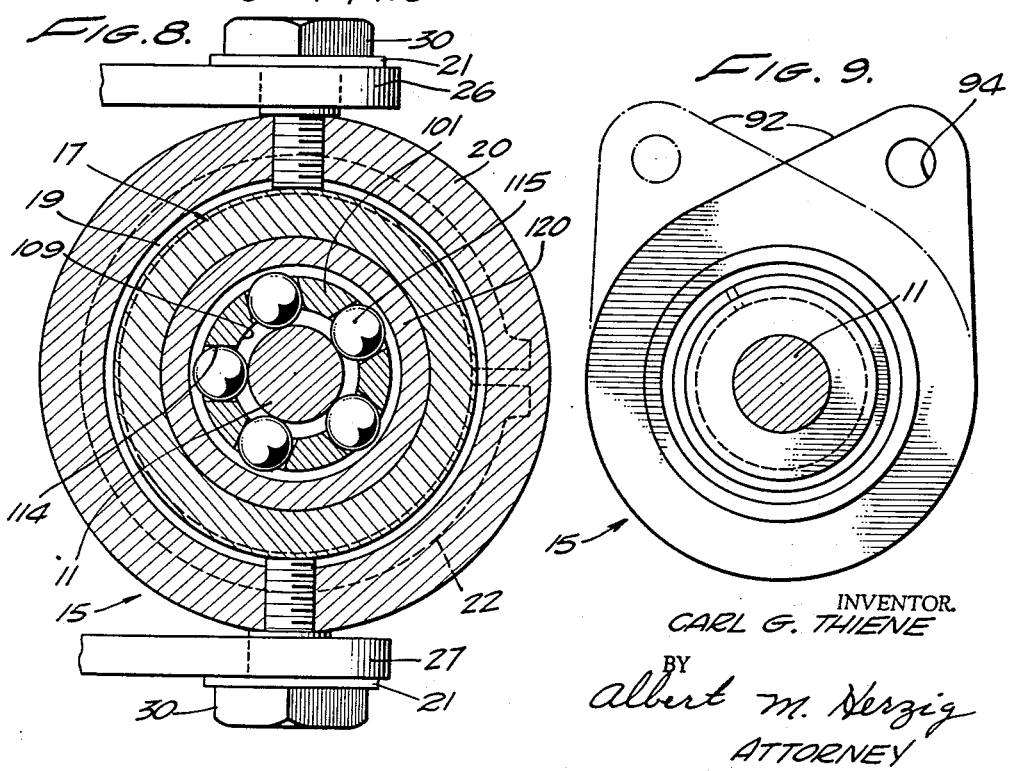

United States Patent Office 3,172,297
Patented Mar. 9, 1965

3,172,297
GRIPPER ADAPTED FOR LINEAL INDEXING
Carl G. Thiene, Rosemead, Calif., assignor to Reynolds Printasign Co., a corporation of Nevada
Filed Aug. 15, 1962, Ser. No. 216,996
10 Claims. (Cl. 74—148)

This invention relates to an improved gripper and more particularly to an improved gripper primarily adapted for gripping and releasing a member which is movable lineally or axially.

The gripper of this invention has particular adaptability and utility in certain environments although it has general adaptability for its purpose. It has particular adaptability in the lineal indexing of a transversely movable carriage such as is shown in the printing machine of the copending application of Carl G. Thiene and Bernard G. Bostrom, Serial No. 217,171, filed August 15, 1962. The carriage is mounted to travel on rollers or trolleys and it is desired that it be moved in increments or indexed each time that an individual letter or character is to be printed. It is desired that this incremental movement be adjustable, but exact, and that there be no overriding of the carriage at the end of each incremental indexing movement. The gripper of this invention adapts itself to gripping and releasing with respect to the movable carriage so that the operating means can achieve the indexing required.

The gripper of this invention is a simplified mechanism designed to accomplish the desired purposes in an effective and simplified way. Further, the gripper provides particular specific features which contribute substantially to its utility and effectiveness for its particular purpose. The gripper is inherently automatic in gripping and releasing. It further includes the feature that upon reaching the limit of the indexing movement the gripper then automatically, positively grips to insure against any overriding movement of the element that has been gripped and moved. This is a very important feature of the gripper when adapted for use in a printing machine. Another feature of the gripper of the invention is the provision in it of a simplified manual means for positively effecting declutching or releasing action. This is of very great utility for purposes of inactivating the gripper to allow free manual movement of the carriage or other comparable element desired.

With the foregoing in mind, the primary purpose of the invention is to provide an improved gripper primarily adapted for gripping and releasing elements that are moved lineally or axially. While this is the primary objective of the invention, it is to be understood that the herein disclosure is illustrative and to the extent that the novel and improved features of the invention may be adapted to or useful in rotary clutches, the disclosure is intended to be illustrative thereof.

Another object of the invention is to provide a gripper as in the foregoing object comprising a gripper body and a gripping assembly adapted for gripping and declutching or releasing an elongated member, the gripping assembly being relatively movable axially as respects the gripper body with spring biasing means normally urging the gripping assembly in a gripping direction.

Another object is to provide a gripper as in the foregoing wherein the gripping assembly is positioned whereby it may strike fixed stop means upon movement of the gripper whereby to effect positive gripping or releasing of the gripper.

Another object is to provide a gripper as in the foregoing including an additional member assembled to provide for relative axial movement as between the said member and the gripper body whereby positive manual declutching or releasing can be realized.

In a preferred form of the gripper it is actuated to perform its indexing functions by an hydraulic cylinder and a return spring.

Further objects and many additional advantages of the invention will become apparent from the following detailed description and annexed drawings wherein:

FIGURE 1 is a side elevational view of a preferred form of the invention showing hydraulic actuating means for the gripper;

FIGURE 2 is a view similar to that of FIGURE 1 showing the parts in another position;

FIGURE 3 is a sectional view taken along the line 3—3 of FIGURE 2;

FIGURE 4 is a sectional view of the gripper of the invention;

FIGURE 5 is a view similar to that of FIGURE 4 showing the gripper in another position in its lineal indexing movement;

FIGURE 6 is a view similar to that of FIGURE 5 showing the gripper moved to a position against a fixed stop;

FIGURE 7 is a view similar to that of FIGURE 6 showing the gripper manually actuated to the positive released position;

FIGURE 8 is a sectional view taken along the line 8—8 of FIGURE 4;

FIGURE 9 is an end view of the manual releasing member on the gripper;

FIGURE 10 is an exploded perspective view of the gripper.

Referring now more in detail to FIGURES 1, 2 and 3 of the drawings, the numeral 10 designates a casting constituting the frame or housing of the gripper. Extending through the frame is a cylindrical shaft 11, one end of which is attached to the carriage assembly 12 which is diagrammatically shown and may represent the movable carriage of a printing machine such as described above. As explained, it is intended that this carriage shall be moved incrementally or indexed along its travel in steps as desired. To accomplish this, the gripper grips the shaft 11 and is moved to index the assembly and releases therefrom as will be described.

The gripper is shown as a whole at 15, it being shown in cross-sectional detail in FIGURES 4 to 10. FIGURES 1 and 2 show a preferred form of operating mechanism for moving the gripper body or assembly for indexing. The gripper operates automatically to grip and release. The gripper comprises a cylindrical body 17 as may be seen more in detail in FIGURE 10. The body has an annular groove as may be seen at 19 and around this part of the body is a support or holder ring 20 which is held axially by snap rings 22 and 23 which snap into annular grooves in the body 17 on opposite sides of the holder ring 20 as may be seen in the figures.

Numerals 26 and 27, as seen in FIGURE 3, comprise two symmetrical members providing a yoke attached to opposite sides of the ring 20 and pivotally mounted by way of trunnion screws as may be seen at 30 in FIGURE 7. The upper parts 31 and 32 of the yoke are adjacent each other and engage on opposite sides of a link member 34 to which these members are attached by a pivot 35 as shown. The link 34 is pivoted by a pivot 37 to a yoke 38 on the end of a stem 40 connecting to a piston in the hydraulic cylinder shown generally at 42. The cylinder 42 may be conventional, the hydraulic fluid therefor being supplied through a tube 43 and the cylinder being mounted on a base 45 at the upper part of the housing or casting 10.

The cylinder 42 is operative to drive the gripper to the left. It is normally urged in the other direction by links as shown at 21 and springs 18 which are under slight tension.

Numeral 47 designates one of a pair of similar links attached to a pivot 49 on opposite sides of the link 34 at one end, the other ends of these links being mounted on a fixed pivot 51 in the frame or casting 10. A further link 53 is provided, one end of which is pivoted on the pivot 51 and the other end of which is pivotally attached to the yoke members 31 and 32 as may be seen at 55. As may be seen therefore, the upper parts of the yoke and the link members as described constitute a parallel motion linkage whereby reciprocatory movement of the stem 40 is imparted to the gripper 15 for moving it axially along the axis of the shaft 11. FIGURES 1 and 2 show the gripper 15 in its extreme positions and from these figures it may be seen how the position of the linkage members changes.

Provided in the end 63 of the casting 10 is a bearing as shown at 65 in FIGURES 4 to 7. Another fixed bearing 66 is provided within the casting 10 it being mounted therein. Bearing 65 has a bushing 67 within it of bearing material. Bearing 66 has a bushing 69 in it and in this bushing is another bushing 70 made of bearing material. The bearing 66 provides a fixed stop limiting the indexing movement of gripper 15 to the left. It may be said at this time that in the operation of the mechanism in a printing machine, a gripper 15 is moved to the right a predetermined amount, the gripper being released during this movement. The gripper is then moved to the left during which movement it grips and moves the shaft or stem 11 until the gripper meets the fixed stop formed by the bearing 66. The amount of movement is determined by the amount of hydraulic fluid supplied to the cylinder 42 whereby the indexing may be made very exact.

FIGURES 1, 2 and 3 show manually actuatable mechanism for effecting positive manual declutching or releasing. This mechanism includes a manual actuating lever or arm 75 attached to one end of the shaft 76 journalled in the casting 10 as may be seen in FIGURE 3. On the shaft or stem 76 is another lever arm 78 which has an angular part 79 at the end. Attached to the part 79 by a screw 82 is a fitting 83 which is a knuckle joint, that is it receives a ball on the end of a curved stem 84. Numeral 86 designates another fitting forming a knuckle joint and receiving a ball on the other end of the stem 84. The knuckle joint fitting 86 has an extending stem 90 which is attached by nuts as shown in FIGURES 1 and 2 to the operating plate or flange 92 on the bushing 93 of the gripper as may be seen in FIGURE 10, the attachment to the flange 92 being through the hole 94.

The operating arm 75, arm 78 and shaft 76 are biased by the coil spring 97 attached at one end to the arm 78 and attached at the other end to a bracket 100 extending outwardly from the casting 10 as shown. The spring 97 moves over center with respect to the axis of the shaft 76 when the gripper is manually actuated as may be observed from FIGURES 1 and 2. The purpose of the flexible linkage formed by the knuckle joints, as described, is to make it possible to rotate the flange or plate 92 in any of the positions of the gripper 15.

Next will be described the details of the gripper 15 itself.

The gripper body 17 is a hollow cylindrical body, as shown, having a bore 102 at one end adjacent which is a counterbore 103. There is a further counterbore which is screw threaded, as shown at 105. Numeral 107 designates a cylindrical member constituting a ball holder, the end of which is slidable in the bore 102 of the gripper body. The ball holder has a bore 108 which the shaft 11 extends through and it has a counterbore 109 in which is received a bushing 110 of bearing material. A similar bushing having an external flange is provided as shown at 112 at the other end of the ball holder. The ball holder has a group of equally spaced openings 114 near its right end in which are received a group of spherical balls as designated at 115.

Received within the counterbore 103 in the gripper body 17 is a gripper member 120 which is a ring shaped member as may be seen in FIGURE 10 having an inside taper, i.e., the inside diameter gradually varies as indicated at 121. Normally the balls 115 are in a position between the shaft 11 and the inner surface of the member 120. The member 120 is held in position in its counterbore by a snap ring 124 received in an annular groove formed at the shoulder at the end of counterbore 103 in the gripper body 17.

The ball holder 107 may move axially with respect to the gripper body 17. It is slidably received within the threaded bushing 93 which threads into the internally threaded end 105 of the gripper body 17. The bushing 93 has a bore 126 to receive the ball holder 107 and it has a counterbore 127. In the counterbore 127 is a coil spring 129 engaged between the bushing 93 and a snap ring 131 received in an annular groove in an intermediate position in the ball holder 107. It can be seen, therefore, that the spring 129 acting against the snap ring 131 normally urges the ball holder 107 to the right within the gripper body so as to keep the balls 115 in engagement with the tapered internal surface of the member 120.

The bushing 93 has a counterbore 134 in its end. The shoulder formed at the inner end of this counterbore may engage, as described hereinafter, with a snap ring 135 fitting in an annular groove in the exterior of the ball holder 107. FIGURE 4 illustrates the relative position of the gripper parts when the gripping is being moved to the right along the shaft 11 under the influence of springs 18 as indicated by the arrow in that figure. When moving in this direction, the gripper automatically declutches or releases, that is, the balls 115 do not wedge between the shaft 11 and the internal tapered surface of part 120. The ball holder 107 is moved by virtue of the engagement of spring 129 with snap ring 131.

FIGURE 5 illustrates movement of the gripper in the opposite direction as indicated by the arrow in that figure. When the gripper is moved to the left, as shown in FIGURE 5, it automatically grips or wedges to the shaft 11. The balls 115 frictionally engage between the shaft 11 and the internal surfaces of part 120 to grip the shaft so that it is moved incrementally, that is it is indexed along with the gripper.

At the extremity of the indexing movement, the left end of the ball holder 107 comes into engagement with the bushings of bearing 66. This stops movement of the ball holder 107, as may be seen in FIGURE 6. The gripper body 17 and bushing 93 can continue to move slightly further to the left. This action causes the gripper to positively clutch or wedge to assure that the shaft is held so that there can be no overriding of its movement at the termination of indexing movement of the gripper. That is the balls 115 now wedge securely between elements 120 and shaft 11. This is a very important feature of the invention because it makes possible accurate indexing even of carriages having considerable mass which accumulate momentum and are difficult to stop precisely.

FIGURE 7 shows the gripper manually actuated to the declutching or release position. The flange member 92 keyed to the bushing 93 is rotated upwardly into the position in which it is shown in FIGURE 1. This rotation of the bushing 93 tends to thread it out of the gripper body 17, that is to move these parts away from each other. This not only reduces the tension of the spring 129 but causes abutment of the lefthand end (relative to FIGURE 7) of the bushing 93 with the snap ring 135 normally held as in a recess in the ball holder 107. This relative movement positively moves the ball holder 107 to the left with respect to the gripper body 17 so that the balls 115 are positively disengaged from the internal tapered surface of the ring 120. Thus, the gripper is positively released and held released so that the shaft 11 can be freely moved manually as desired.

Summarizing the foregoing operation, those skilled in the art will observe that the gripper makes it possible to accurately lineally index a movable part through any desired increment of movement. That is, the movements of the gripper may be accurately adjusted or determined by the amount of fluid admitted to the hydraulic cylinder 42. The limit of movement is predetermined by the fixed stop 66 which, as described above, causes the gripper to then firmly and positively clutch or wedge, to prevent any overriding of the member being indexed. The clutching or wedging action of the gripper is automatic upon its movement, as is its releasing action upon movement in the other direction. As explained, whenever it is desired to positively release the gripper in order to allow the member 11 to be moved manually, this may be done very simply and effectively by rotating the bushing 93. It may be seen, therefore, that the invention realizes and accomplishes all of the objects and advantages outlined in the foregoing. The gripping and releasing operations are automatic in a very simple and effective device. Automatic positive gripping is provided at the limitive movement of the gripper and the manual unclutching is provided as described.

It will be observed by those skilled in the art that the gripper is operable in a reverse manner, that is, the shaft 11 could be moved in which event the gripper would grip and release in the same manner as already described.

The foregoing disclosure is representative of a preferred form of the invention and is to be interpreted in an illustrative rather than a limiting sense, the invention to be accorded the full scope of the claims appended hereto.

I claim:
1. A gripper comprising in combination:
  (a) an elongated member;
  (b) a gripper body having a counterbore provided therein;
  (c) a tapered ring loosely mounted in said counterbore, said tapered ring having a tapered surface;
  (d) friction members mounted between said elongated member and said tapered surface, whereby when said gripper is moved in one direction said friction members are wedged between said tapered surface and said elongated member to grip said elongated member, and when said gripper is moved in the opposite direction said friction members are automatically released from said wedged condition;
  (e) spring means normally biasing said friction members with respect to said tapered surface to urge said friction members into said wedged condition; and
  (f) an externally threaded member threadedly engaging said gripper body, said externally threaded member being positionable to overcome the bias of said spring upon rotation of said externally threaded member to release said friction members from said wedged condition.

2. A gripper as in claim 1 including a lever mounted on said externally threaded member for rotating it.

3. A gripper as in claim 2 comprising connections between said lever and said threaded member including joints whereby said gripper can be manually actuated to release in a plurality of axial positions thereof.

4. A gripper comprising in combination:
  (a) fixed bearing means;
  (b) a shaft slidably mounted in said bearing means;
  (c) a holder member slidably mounted on said shaft;
  (d) a gripper body slidably mounted on said holder member;
  (e) a tapered ring mounted in said gripper body for providing a tapered surface;
  (f) friction members mounted in said holder member for wedging engagement between said tapered surface and said shaft;
  (g) spring means normally biasing said holder member with respect to said gripper body to urge said friction members into said wedging engagement, said friction members being mounted between said shaft and said ring, whereby when said gripper is moved in one direction said friction members automatically engage and hold said shaft, and when said gripper is moved in the opposite direction said friction members automatically release said shaft, said gripper body being mounted on said holder member in such a manner that said gripper body moves past said fixed bearing means when said holder member is in engagement therewith, thereby positioning said holder member axially in such a manner with respect to said ring that said friction members are wedged between said tapered surface and said shaft to prevent overriding movement thereof.

5. An indexing apparatus comprising in combination:
  (a) annular fixed bearing means;
  (b) a shaft mounted in said bearing means for indexing movement therethrough;
  (c) a ball holder encompassing said shaft in sliding engagement therewith;
  (d) first stop means encompassing one end of said ball holder;
  (e) a plurality of spherical balls carried by the other end of said ball holder;
  (f) second stop means encompassing said ball holder intermediate its ends;
  (g) externally threaded bushing means rotatably and slidably mounted on said ball holder, said externally threaded bushing means being provided with counterbores at each of its ends;
  (h) an internally threaded gripper body threadedly engaging said externally threaded bushing means, said gripper body including internal threads at one end and being provided with a bore at its other end, said other end of said gripper body being slidably mounted on said ball holder, said gripper body also being provided with a counterbore intermediate said internal threads and its said other end;
  (i) a ring-shaped tapered member mounted in said counterbore in said gripper body in encompassing relationship with said balls, said ring-shaped member having a tapered inner wall adapted to force said balls into engagement with said shaft when said gripper body is slid laterally on said ball holder toward said bearing means;
  (j) spring means having one end abutting said second stop means and another end abutting said externally threaded bushing means for normally urging said balls into engagement with said tapered inner wall; and
  (k) lever means connected to said gripper body for sliding said body toward said bearing means to index said shaft incrementally until said ball holder engages said fixed bearing means, said fixed bearing means being engageable only by said ball holder, whereby said externally threaded bushing and said gripper body are free to override said ball holder to maintain said tapered inner wall in engagement with said balls and prevent overriding of said shaft when said indexing apparatus reaches the end of its indexing stroke.

6. In combination with a shaft to be indexed, an indexing apparatus comprising:
  (a) a frame member;
  (b) an annular fixed bearing mounted on said frame member, said shaft being slidably mounted in said bearing;
  (c) gripper means slidably and rotatably mounted on said shaft for gripping said shaft and indexing it through said bearing when said gripper means is moved laterally toward said bearing, said gripper means comprising:
    (aa) a ball holder encompassing said shaft in sliding engagement therewith;

(bb) a first snap ring encompassing one end of said ball holder and being held captive thereby;

(cc) a plurality of spherical balls carried by the other end of said ball holder, said balls being engageable with said shaft to index it;

(dd) a second snap ring encompassing said ball holder intermediate its ends and being held captive thereby;

(ee) an externally threaded bushing rotatably and slidably mounted on said ball holder, said externally threaded bushing being provided with an annular shoulder at each of its ends;

(ff) a coil spring encompassing said ball holder, said coil spring having one end abutting said second snap ring and another end abutting one of said annular shoulders on said externally threaded bushing, the other of said annular shoulders on said externally threaded bushing being engageable with said first snap ring;

(gg) an internally threaded gripper body threadedly engaging said externally threaded bushing, said gripper body including internal threads at one end and being provided with a bore at its other end, said other end of said gripper body being slidably mounted on said ball holder, said gripper body also being provided with a counterbore intermediate said internal threads and its said other end;

(hh) a ring-shaped member mounted in said counterbore in said gripper body in encompassing relationship with said balls, said ring-shaped member having a tapered inner wall adapted to force said balls into engagement with said shaft when said gripper body is slid laterally on said ball holder toward said bearing, said coil spring normally urging said balls into engagement with said tapered inner wall;

(ii) first lever means connected to said externally threaded bushing for rotating it into engagement with said first snap ring to shift said ball holder in such a manner that said balls are disengaged from said tapered inner wall; and (d) second lever means connected to said gripper means for indexing said shaft incrementally until said ball holder engages said fixed bearing, said fixed bearing being engageable only by said ball holder, whereby said externally threaded bushing and said gripper body are free to override said ball holder to maintain said tapered inner wall in engagement with said balls and prevent overriding of said shaft when said gripper means reaches the end of its indexing stroke.

7. The combination of claim 6 including means connected to said gripper means for biasing it away from said bearing.

8. An apparatus for incrementally indexing a shaft means, comprising:

gripper body means encompassing said shaft, said gripper body means providing a tapered surface;

friction member means mounted between said shaft means and said tapered surface in such a manner that, when said gripper body means is moved lineally in one direction, said friction member means is wedged tightly between said tapered surface and said shaft means to index it and, when said body means is moved lineally in the opposite direction, said friction member means releases said shaft means;

stop means mounted in the path of travel of said friction member means for engagement therewith when said body means is moved lineally in said one direction, said body means being adapted to travel beyond said stop means while said friction member means is stopped thereby, whereby said friction member means remains tightly wedged between said tapered surface and said shaft means to prevent it from overriding an indexing increment; and motion transmitting means connected to said gripper body means for moving it lineally.

9. The apparatus of claim 8 wherein said motion transmitting means comprises:

stem means connected to a power input source, said stem means being mounted adjacent and parallel to said shaft means; and parallel motion linkage means connecting said stem means to said body means, said parallel motion linkage means transmitting the movement of said stem means to said body means without imparting a side thrust thereto.

10. The apparatus of claim 8 wherein said friction member means comprises:

a ball holder; and a plurality of spherical balls mounted in said ball holder in encompassing relationship with said shaft means.

References Cited by the Examiner
UNITED STATES PATENTS

| | | | |
|---|---|---|---|
| 571,792 | 11/96 | Quinby | 74—162 XR |
| 581,136 | 4/97 | Preece | 74—162 |
| 1,754,132 | 4/30 | Bekkum | 74—162 XR |
| 2,308,348 | 1/43 | Ballsh | 226—165 XR |
| 2,763,191 | 9/56 | Wells | 74—88 XR |

FOREIGN PATENTS

| | | |
|---|---|---|
| 988,810 | 5/51 | France. |

BROUGHTON G. DURHAM, *Primary Examiner.*